US012553955B2

United States Patent
Ishii et al.

(10) Patent No.: US 12,553,955 B2
(45) Date of Patent: Feb. 17, 2026

(54) CURRENT LEAKAGE DETECTION CIRCUIT, AND BATTERY STATE DETECTION CIRCUIT

(71) Applicant: Nuvoton Technology Corporation Japan, Kyoto (JP)

(72) Inventors: Takuya Ishii, Osaka (JP); Ginga Katase, Kyoto (JP); Shuya Yamasaki, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 82 days.

(21) Appl. No.: 18/471,834

(22) Filed: Sep. 21, 2023

(65) Prior Publication Data

US 2024/0012069 A1    Jan. 11, 2024

Related U.S. Application Data

(63) Continuation of application No. PCT/JP2022/015337, filed on Mar. 29, 2022.

(30) Foreign Application Priority Data

Mar. 31, 2021   (JP) ................. 2021-062232

(51) Int. Cl.
G01R 31/52      (2020.01)
G01R 31/00      (2006.01)

(52) U.S. Cl.
CPC ........... *G01R 31/52* (2020.01); *G01R 31/007* (2013.01)

(58) Field of Classification Search
CPC ...... G01R 31/52; G01R 31/007; G01R 27/18; Y02E 60/10
See application file for complete search history.

(56) References Cited

U.S. PATENT DOCUMENTS

2007/0241758 A1   10/2007  Kamata
2009/0001993 A1*   1/2009  Lindsey ............... B60W 10/08
                                              340/650

(Continued)

FOREIGN PATENT DOCUMENTS

JP    2007-256114 A    10/2007

OTHER PUBLICATIONS

Extended European Search Report dated Aug. 29, 2024 issued in the corresponding European Patent Application No. 22780879.7.

(Continued)

*Primary Examiner* — Daniel R Miller
(74) *Attorney, Agent, or Firm* — Rimon P.C.

(57) ABSTRACT

A current leakage detection circuit that detects current leakage from a battery having a first electrode and a second electrode, which is either the positive electrode or the negative electrode opposite to the first electrode, to a chassis includes: a detection circuit including a reference voltage source terminal, a first detection terminal, and a ground terminal connected to the first electrode; a first resistor connected between the second electrode and the chassis; a second resistor connected between the chassis and the first detection terminal; and a third resistor connected between the first detection terminal and a predetermined terminal. When the first electrode is the positive electrode, the predetermined terminal is the reference voltage source terminal. When the first electrode is the negative electrode, the predetermined terminal is the first electrode. The detection circuit detects an occurrence of current leakage based on a voltage of the first detection terminal.

14 Claims, 14 Drawing Sheets

(56) References Cited

U.S. PATENT DOCUMENTS

| | | |
|---|---|---|
| 2014/0084933 A1 | 3/2014 | Jang et al. |
| 2019/0011504 A1 | 1/2019 | Kim et al. |
| 2019/0146040 A1 | 5/2019 | Murakami et al. |
| 2022/0203838 A1* | 6/2022 | Ham ................. B60L 3/0038 |

OTHER PUBLICATIONS

International Search Report dated Jun. 14, 2022 issued in International Patent Application No. PCT/JP2022/015337, with English translation.

* cited by examiner

CURRENT LEAKAGE DETECTION CIRCUIT, AND BATTERY STATE DETECTION CIRCUIT

CROSS REFERENCE TO RELATED APPLICATIONS

This is a continuation application of PCT International Application No. PCT/JP2022/015337 filed on Mar. 29, 2022, designating the United States of America, which is based on and claims priority of Japanese Patent Application No. 2021-062232 filed on Mar. 31, 2021. The entire disclosures of the above-identified applications, including the specifications, drawings and claims are incorporated herein by reference in their entirety.

FIELD

The present disclosure relates to a current leakage detection circuit and a battery state detection circuit.

BACKGROUND

Motor-driven vehicles such as an electric vehicle is equipped with a high-voltage, high-capacity battery that supplies direct-current power to a motor. Such a high-voltage battery includes a plurality of battery cells that are lithium-ion batteries or the like connected in series, and is insulated from the vehicle-body chassis that is taken as the ground for safety reasons.

A current leakage detection circuit that detects an occurrence of current leakage between a high-voltage battery and the vehicle-body chassis is disclosed by, for example, Patent Literature (PTL) 1.

CITATION LIST

Patent Literature

PTL 1: Japanese Unexamined Patent Application Publication No. 2007-256114

SUMMARY

Technical Problem

Since a current leakage detection circuit typically connects its detection resistor to the vehicle-body chassis, the current leakage detection circuit is configured to use the electric potential of the vehicle-body chassis as a reference, where the vehicle-body chassis is regarded as zero potential. Meanwhile, a battery state detection circuit may be configured to use the electric potential of the positive electrode of a battery as a reference to monitor battery voltages and charge and discharge currents. When a current leakage detection circuit that detects an occurrence of current leakage in a battery is provided as one function of the battery state detection circuit, it is also useful to configure the current leakage detection circuit to use the electric potential of the positive electrode of the battery as a reference. PTL 1 discloses one example of a current leakage detection circuit that is configured to use the electric potential of a battery as a reference. This current leakage detection circuit is configured to regard the negative electrode of the battery as zero potential of the current leakage detection circuit. For this reason, the above-described current leakage detection circuit cannot be applied to a battery state detection circuit when the battery state detection circuit of the battery is configured to regard the positive electrode as zero potential, where the battery state detection circuit detects a current on the positive electrode side of the battery.

The present disclosure provides a current leakage detection circuit that can use either the positive electrode or the negative electrode of a battery as a reference for its zero potential.

Solution to Problem

In order to address the above-described technical problem, a current leakage detection circuit according to one aspect of the present disclosure is a current leakage detection circuit that detects current leakage from a battery having a first electrode and a second electrode to a chassis. The first electrode is one of a positive electrode and a negative electrode, and the second electrode is the other of the positive electrode and the negative electrode. The current leakage detection circuit includes: a detection circuit including a reference voltage source terminal for outputting a reference voltage, a first detection terminal, and a ground terminal connected to the first electrode; a first resistor connected between the second electrode and the chassis; a second resistor connected between the chassis and the first detection terminal; and a third resistor connected between the first detection terminal and a predetermined terminal. When the first electrode is the positive electrode, the predetermined terminal is the reference voltage source terminal. When the first electrode is the negative electrode, the predetermined terminal is the first electrode. The detection circuit detects a voltage of the first detection terminal, and detects an occurrence of current leakage based on the voltage detected.

In addition, a battery state detection circuit according to one aspect of the present disclosure includes: the above-described current leakage detection circuit; a current detection resistor connected between the first electrode and a load; and an amplifier circuit that detects a voltage across the current detection resistor as a signal indicating a current value of the battery.

Advantageous Effects

A current leakage detection circuit according to the present disclosure can use either the positive electrode or the negative electrode of a battery as a reference for its zero potential.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, a current leakage detection circuit and a battery state detection circuit according to one aspect of the present disclosure will be described in detail with reference to the drawings.

Note that the embodiments described below each show a general or specific example of the present disclosure. The numerical values, shapes, materials, elements, the arrangement and connection of the elements, steps, orders of the steps, etc. presented in the embodiments below are mere examples and are not intended to limit the present disclosure. Furthermore, among the elements in the embodiments below, those not recited in any one of the independent claims representing the most generic concepts will be described as optional elements.

Embodiment 1

A current leakage detection circuit according to Embodiment 1 is configured such that the current leakage detection circuit can use either the positive electrode or the negative electrode of a battery as a reference for its zero potential. First, a current leakage detection circuit that is configured to regard the positive electrode of a battery as zero potential will be described with reference to FIG. 1A through FIG. 1C and FIG. 2.

[1.1 Example of Current Leakage Detection Circuit Configured Using Positive Electrode of Battery as Reference]

Figure 1A:
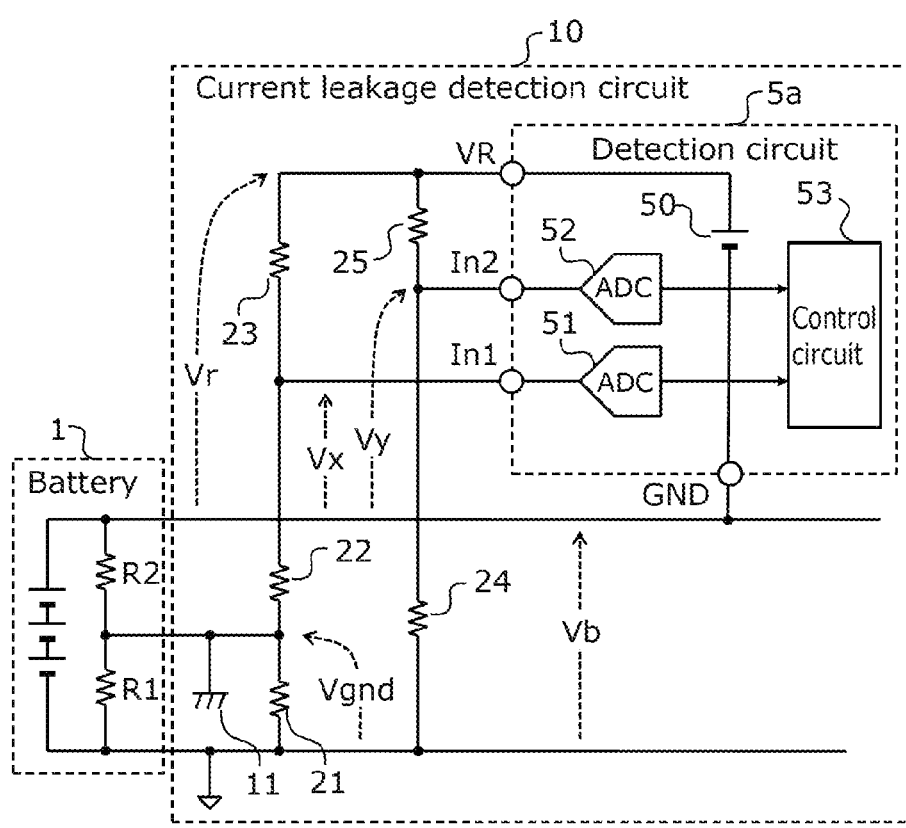
FIG. 1A is a diagram illustrating an example of a circuit configuration of a current leakage detection circuit according to Embodiment 1 which is configured on the positive electrode side of a battery.

FIG. 1A is a diagram illustrating an example of a circuit configuration of a current leakage detection circuit according to Embodiment 1 which is configured on the positive electrode side of a battery. FIG. 1A also illustrates battery 1. Since battery 1 is provided in, for example, an electric vehicle to supply a voltage of several hundred volts, battery 1 includes a plurality of battery cells connected in series. Due to a high voltage, battery 1 is insulated from the vehicle-body ground for safety reasons, and the insulation resistance is typically a high resistance of at least several MΩ. In FIG. 1A, it is assumed that insulation resistance R1 between the negative electrode and the vehicle-body ground and insulation resistance R2 between the positive electrode and the vehicle-body ground are equivalent. Note that battery 1 and current leakage detection circuit 10 may be provided in something other than electric vehicles. Battery 1 and current leakage detection circuit 10 may be provided in, for example, automobiles, electricity storage systems, aircraft, marine vehicles, server devices, and automatic guided vehicles (AGVs). Current leakage detection circuit 10 is applied for detection of current leakage in battery 1 in an appliance or a device required to insulate the chassis ground and battery 1, where the chassis ground is a chassis ground of the appliance or device including battery 1.

Current leakage detection circuit 10 shown in FIG. 1A includes resistors 21 to 25 and detection circuit 5a. Detection circuit 5a includes reference voltage source terminal VR, detection terminal Int, detection terminal Int, ground terminal GND, reference voltage source 50, AD converter 51, AD converter 52, and control circuit 53. For each of resistors 21 to 25, a terminal on the negative electrode side of the two terminals is hereafter called a first terminal, and a terminal on the positive electrode side of the two terminals is hereinafter called a second terminal.

Resistor 21 is a resistor connected between the negative electrode of battery 1 and chassis 11 that is taken as the vehicle-body ground. Specifically, the first terminal of resistor 21 is connected to the negative electrode of battery 1. The second terminal of resistor 21 is connected to chassis 11. Resistor 21 has a resistance value of r1.

Resistor 22 is a resistor connected between detection terminal Int and chassis 11 that is taken as the vehicle-body ground. Specifically, the first terminal of resistor 22 is connected to chassis 11. The second terminal of resistor 22 is connected to the first terminal of resistor 23 and detection terminal Int. Resistor 22 has a resistance value of r2.

Resistor 23 is a resistor connected between reference voltage source terminal VR and detection terminal Int. Specifically, the first terminal of resistor 23 is connected to the second terminal of resistor 22 and detection terminal Int. The second terminal of resistor 23 is connected to reference voltage source terminal VR. Resistor 23 has a resistance value of r3.

Resistor 24 is a resistor connected between the negative electrode of battery 1 and detection terminal In2. Specifically, the first terminal of resistor 24 is connected to the negative electrode of battery 1. The second terminal of resistor 24 is connected to the first terminal of resistor 25 and detection terminal In2. Resistor 24 has a resistance value of r4.

Resistor 25 is a resistor connected between reference voltage source terminal VR and detection terminal In2. Specifically, the first terminal of resistor 25 is connected to the second terminal of resistor 24 and detection terminal In2. Resistor 25 has a resistance value of r5.

Detection circuit 5a is configured to regard the positive electrode of battery 1 as zero potential. Specifically, ground terminal GND of detection circuit 5a is connected to the positive electrode of battery 1. Detection circuit 5a detects a voltage of detection terminal Int as detection voltage Vx, and detects an occurrence of current leakage based on detection voltage Vx.

Reference voltage source terminal VR is connected to the second terminal of resistor 23 and the second terminal of resistor 25.

Detection terminal In1 is connected to the connection point at which resistor 22 and resistor 23 are connected.

Detection terminal In2 is connected to the connection point at which resistor 24 and resistor 25 are connected.

Reference voltage source 50 is a voltage source that outputs reference voltage Vr. Reference voltage source 50 is, for example, a regulator circuit that stabilizes a direct-current supply voltage supplied from an external power source to a constant voltage, and outputs the constant voltage as reference voltage Vr. Reference voltage Vr is supplied from reference voltage source 50 to the second terminal of resistor 23 and the second terminal of resistor 25 via reference voltage source terminal VR. In addition, reference voltage Vr is used as a power supply of AD converter 51, AD converter 52, and control circuit 53.

AD converter 51 converts a voltage applied to detection terminal In1 from an analog voltage to a digital voltage.

AD converter 52 converts a voltage applied to detection terminal In2 from an analog voltage to a digital voltage.

Control circuit 53 determines, based on an output of AD converter 51, whether current leakage is occurring, and detects a voltage of battery 1 based on an output of AD converter 52. Control circuit 53 is, for example, a microcomputer.

In the above-described configuration, a detection voltage applied to detection terminal In1 is designated as Vx, and a detection voltage applied to detection terminal In2 is designated as Vy. Moreover, a voltage of battery 1 is designated as Vb, and the electric potential of the vehicle-body ground using the electric potential of the negative electrode of battery 1 as a reference is designated as Vgnd. Detection voltage Vy applied to detection terminal In2 corresponds to battery voltage Vb. The relationship between detection voltage Vy and battery voltage Vb is expressed by (Equation 1a) and (Equation 1b). In addition, detection voltage Vx corresponds to electric potential Vgnd of the vehicle-body ground. The relationship between detection voltage Vx and electric potential Vgnd of the vehicle-body ground is expressed by (Equation 2a) and (Equation 2b).

[Math. 1]

$$Vy = \frac{r4 \cdot Vr - r5 \cdot Vb}{r4 + r5} \quad \text{(Equation 1a)}$$

$$Vb = \frac{r4}{r5} \cdot (Vr - Vy) - Vy \quad \text{(Equation 1b)}$$

[Math. 2]

$$Vx = Vr - \frac{r3}{r2 + r3} \cdot (Vb + Vr - Vgnd) \quad \text{(Equation 2a)}$$

$$Vgnd = Vb - \frac{r2}{r3} \cdot (Vr - Vx) + Vx \quad \text{(Equation 2b)}$$

Meanwhile, electric potential Vgnd of the vehicle-body ground is also expressed like (Equation 3) using each of the resistance values.

[Math. 3]

$$Vgnd = \left(\frac{Vb}{R2} + \frac{Vb + Vr}{r2 + r3}\right) / \left(\frac{1}{R1} + \frac{1}{R2} + \frac{1}{r1} + \frac{1}{r2 + r3}\right) \quad \text{(Equation 3)}$$

Figure 2:
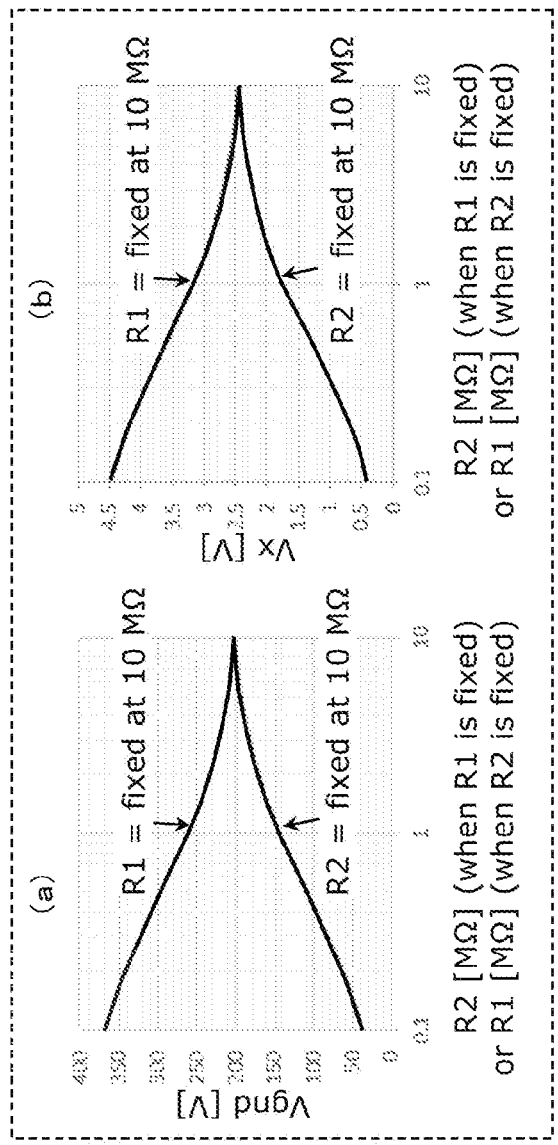
FIG. 2 is a diagram illustrating an example of a property of the current leakage detection circuit according to Embodiment 1.

FIG. 2 is a diagram illustrating an example of a property of the current leakage detection circuit shown in FIG. 1A. In FIG. 2, Vb is to have 400 V, and other conditions are set as follows: Vr=5 V, r1=1 MΩ, r2=0.9875 MΩ, and r3=0.0125 MΩ. FIG. 2 illustrates calculation results of (a) electric potential Vgnd of the vehicle chassis calculated using (Equation 3) and (b) detection voltage Vx calculated using (Equation 2a) and (Equation 2b) under the following two conditions where (i) R1 is fixed at 10 MΩ while R2 is changed from 0.1 MΩ to 10 MΩ and (ii) R2 is fixed at 10 MΩ while R1 is changed from 0.1 MΩ to 10 MΩ.

When insulation resistances R1 and R2 both have a high resistance as 10 MΩ, electric potential Vgnd of the vehicle-body ground is approximately determined by voltage division made by resistors 21 to 23. Accordingly, when r1=r2+r3 holds true as indicated above, the equation Vgnd=(Vb+Vr)/2 holds true, and detection voltage Vx can also be set at about 2.5 V. However, when an insulation failure, namely, current leakage, occurs for some reason, and, for example, insulation resistance R1 is reduced, electric potential Vgnd of the vehicle-body ground is reduced, and detection voltage Vx is also reduced along with the reduction in electric potential Vgnd of the vehicle-body ground. Alternatively, when insulation resistance R2 is reduced, electric potential Vgnd of the vehicle-body ground is increased, and detection voltage Vx is also increased along with the increase in electric potential Vgnd of the vehicle-body ground. Therefore, control circuit 53 can detect an insulation failure by determining whether detection voltage Vx is out of a predetermined range. In addition, control circuit 53 may calculate battery voltage Vb from detection voltage Vy using (Equation 1b).

[1.11 Variation of Current Leakage Detection Circuit Configured Using Positive Electrode of Battery as Reference]

Next, a variation of current leakage detection circuit 10 will be described.

Figure 1B:
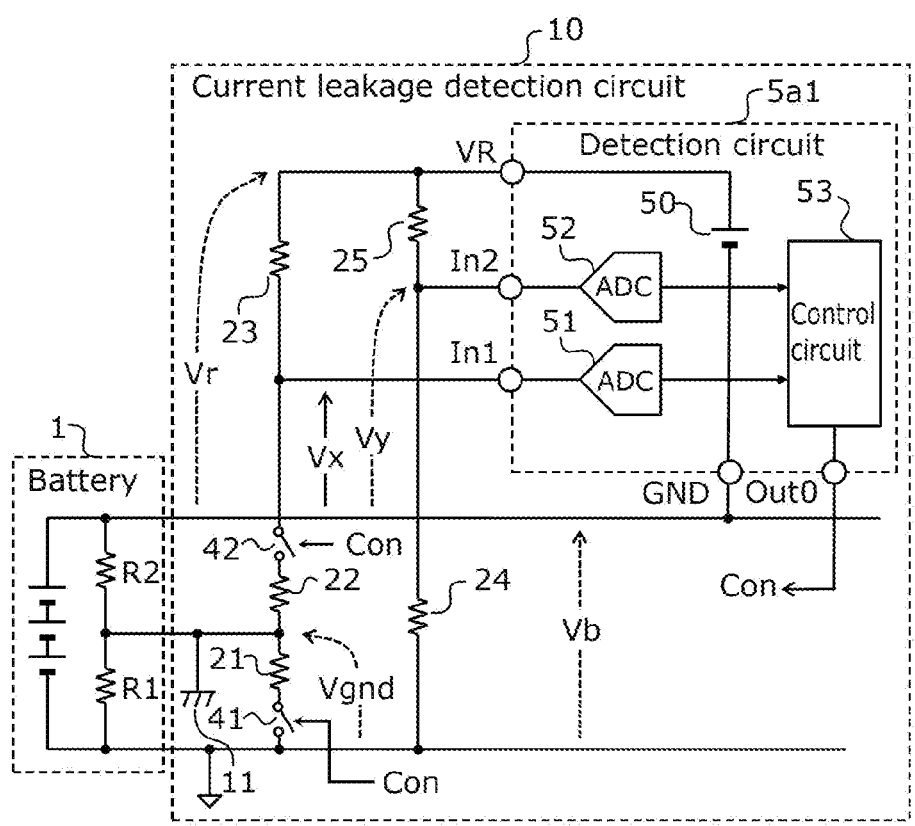
FIG. 1B is a diagram illustrating a variation of the current leakage detection circuit shown in FIG. 1A.

FIG. 1B is a diagram illustrating a variation of the current leakage detection circuit shown FIG. 1A. Compared to FIG. 1A, current leakage detection circuit 10 shown in FIG. 1B is different in that switch 41 and switch 42 are added, and detection circuit 5a is replaced by detection circuit 5a1. Hereinafter, different points will be mainly described to avoid redundant description.

Switch 41 is connected in series to resistor 21, and is connected between resistor 21 and the negative electrode of battery 1. Specifically, the first terminal of switch 41 is connected to the negative electrode of battery 1. The second terminal of switch 41 is connected to the first terminal of resistor 21. Switch 41 has a control terminal to which control signal Con from control circuit 53 is input.

Switch 42 is connected between resistor 22 and first detection terminal In1. Specifically, the first terminal of switch 42 is connected to the second terminal of resistor 22, and the second terminal of switch 42 is connected to detection terminal In1 and the first terminal of resistor 23. Switch 42 has a control terminal to which control signal Con from control circuit 53 is input.

Control circuit 53 inside detection circuit 5a1 has an additional function of generating control signal Con for controlling turning ON and OFF of switch 41 and switch 42. Control circuit 53 turns switch 41 and switch 42 ON during a period of detecting current leakage, and turns switch 41 and switch 42 OFF during a period other than the period of detecting current leakage.

This allows no current to flow through resistors for voltage division in current leakage detection circuit 10 during a period other than the period of detecting current leakage, for example.

[1.12 Another Variation of Current Leakage Detection Circuit Configured Using Positive Electrode of Battery as Reference]

Figure 1C:
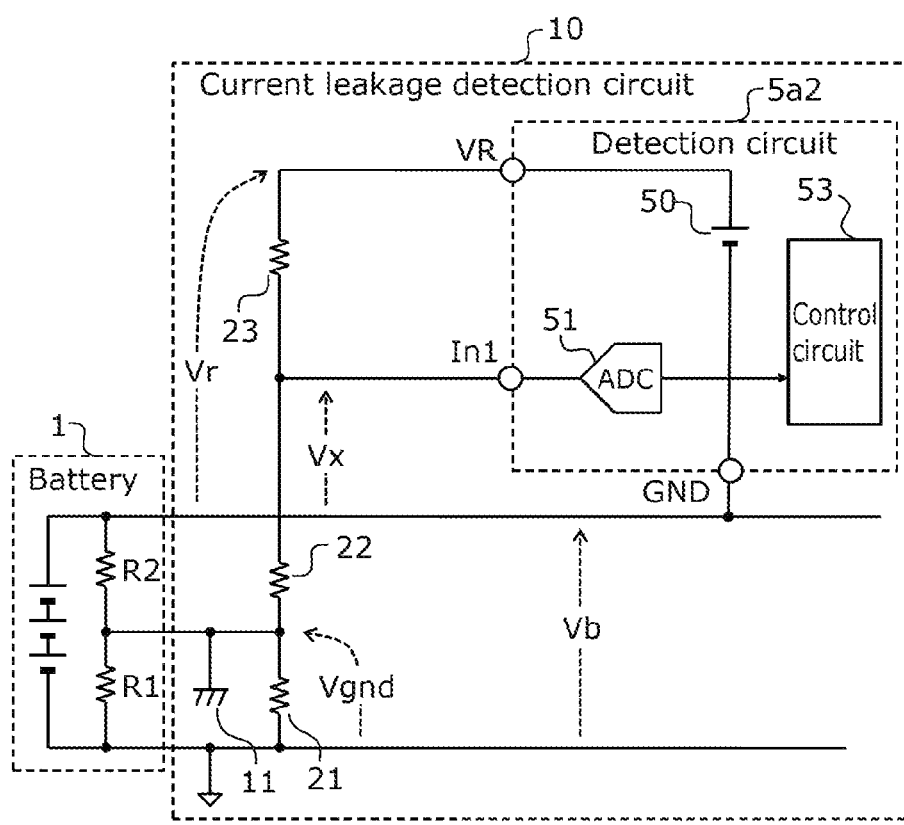
FIG. 1C is a diagram illustrating another variation of the current leakage detection circuit shown in FIG. 1A.

FIG. 1C is a diagram illustrating another variation of the current leakage detection circuit shown in FIG. 1A. Compared to FIG. 1A, current leakage detection circuit 10 shown in FIG. 1C is different in that resistor 24, resistor 25, AD converter 52, and detection terminal In2 are excluded, and detection circuit 5a is replaced by detection circuit 5a2. Hereinafter, different points will be mainly described.

The excluded resistor 24, resistor 25, AD converter 52, and detection terminal In2 are circuit parts for calculating battery voltage Vb based on voltage Vy. Consequently, detection circuit 5a2 shown in FIG. 1C illustrates an example of a configuration including the minimum number of elements required for detecting an occurrence of current leakage without calculating battery voltage Vb.

[1.2 Example of Current Leakage Detection Circuit Configured Using Negative Electrode of Battery as Reference]

Next, a current leakage detection circuit that is configured to regard the negative electrode of a battery as zero potential will be described with reference to FIG. 3A through FIG. 3C and FIG. 4.

Figure 3A:
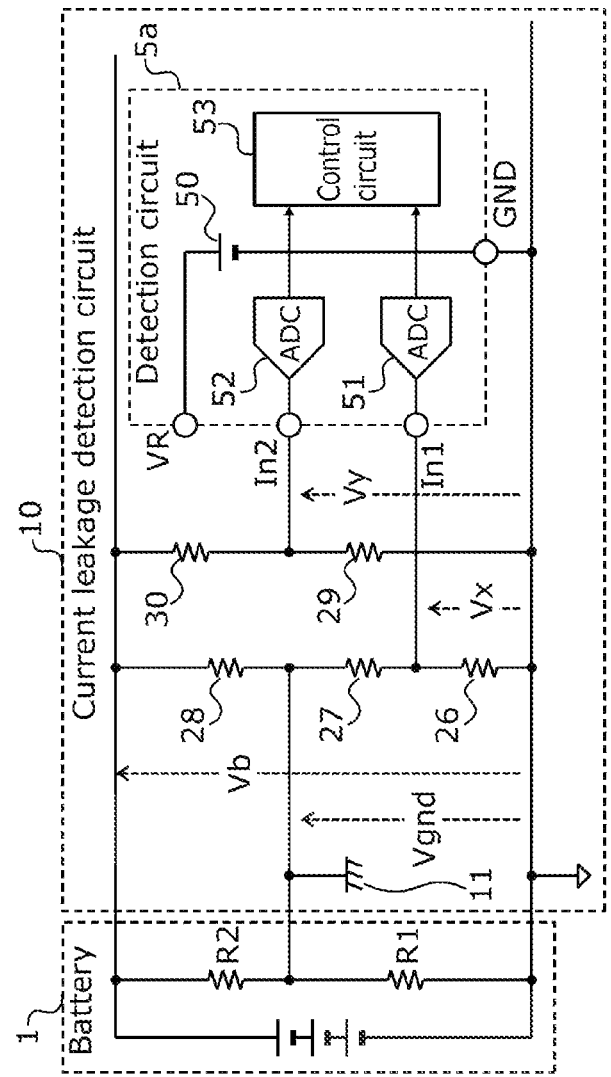
FIG. 3A is a diagram illustrating an example of a circuit configuration of the current leakage detection circuit according to Embodiment 1 which is configured on the negative electrode side of the battery.

FIG. 3A is a diagram illustrating an example of a circuit configuration of a current leakage detection circuit in which detection circuit 5a shown in FIG. 1A is configured to regard the negative electrode of battery 1 as zero potential. In FIG. 3A, ground terminal GND of detection circuit 5a is connected to the negative electrode of battery 1.

Current leakage detection circuit 10 shown in FIG. 3A includes resistor 26 through resistor 30 and detection circuit 5a.

Resistor 26 is a resistor connected between the negative electrode of battery 1 and detection terminal Int. Specifically, the first terminal of resistor 26 is connected to the negative electrode of battery 1. The second terminal of resistor 26 is connected to detection terminal Int and the first terminal of resistor 27. Resistor 26 has a resistance value of r6.

Resistor 27 is a resistor connected between detection terminal Int and chassis 11 that is the vehicle-body ground. Specifically, the first terminal of resistor 27 is connected to detection terminal Int and the second terminal of resistor 26. The second terminal of resistor 27 is connected to chassis 11 and the first terminal of resistor 28. Resistor 27 has a resistance value of r7.

Resistor 28 is a resistor connected between the positive electrode of battery 1 and the vehicle-body ground. Specifically, the first terminal of resistor 28 is connected to chassis 11 and the second terminal of resistor 27. Resistor 28 has a resistance value of r8.

Resistor 29 is a resistor connected between the negative electrode of battery 1 and detection terminal In2. Specifically, the first terminal of resistor 29 is connected to the negative electrode of battery 1. The second terminal of resistor 29 is connected to detection terminal In2 and the first terminal of resistor 30. Resistor 29 has a resistance value of r9.

Resistor 30 is a resistor connected between the positive electrode of battery 1 and detection terminal In2. Specifically, the first terminal of resistor 30 is connected to detection terminal In2 and the second terminal of resistor 29. The second terminal of resistor 30 is connected to the positive electrode of battery 1. Resistor 30 has a resistance value of r10.

Detection circuit 5a has the same configuration as detection circuit 5a shown in FIG. 1A. However, reference voltage source terminal VR of detection circuit 5a is not connected to a resistor for voltage division. Since in FIG. 1A, detection circuit 5a regards the positive electrode of battery 1 as its zero potential, reference voltage source terminal VR is connected to the second terminal of resistor 23 so that partial voltage values of resistor 21 through resistor 23 can be detected. Meanwhile, in FIG. 3A, detection circuit 5a regards the negative electrode of battery 1 as its zero potential. Accordingly, detection circuit 5a can detect partial voltage values of resistors 26 through 28 without an increase in the electric potential of the second terminal of resistor 28.

Detection voltage Vy corresponds to battery voltage Vb also in the above-described configuration. The relationship between detection voltage Vy and battery voltage Vb is expressed by (Equation 4a) and (Equation 4b). In addition, detection voltage Vx corresponds to electric potential Vgnd of the vehicle-body ground. The relationship between detection voltage Vx and electric potential Vgnd of the vehicle-body ground is expressed by (Equation 5a) and (Equation 5b).

[Math. 4]

$$Vy = \frac{r9}{r9 + r10} \cdot Vb \qquad \text{(Equation 4a)}$$

$$Vb = \left(1 + \frac{r10}{r9}\right) \cdot Vy \qquad \text{(Equation 4b)}$$

[Math. 5]

$$Vx = \frac{r6}{r6 + r7} \cdot Vgnd \qquad \text{(Equation 5a)}$$

$$Vgnd = \left(1 + \frac{r7}{r6}\right) \cdot Vx \qquad \text{(Equation 5b)}$$

Meanwhile, electric potential Vgnd of the vehicle-body ground is also expressed like (Equation 6) using each of the resistance values.

[Math. 6]

$$Vgnd = Vb \cdot \left(\frac{1}{R2} + \frac{1}{r8}\right) \bigg/ \left(\frac{1}{R1} + \frac{1}{R2} + \frac{1}{r6 + r7} + \frac{1}{r8}\right) \qquad \text{(Equation 6)}$$

Figure 4:
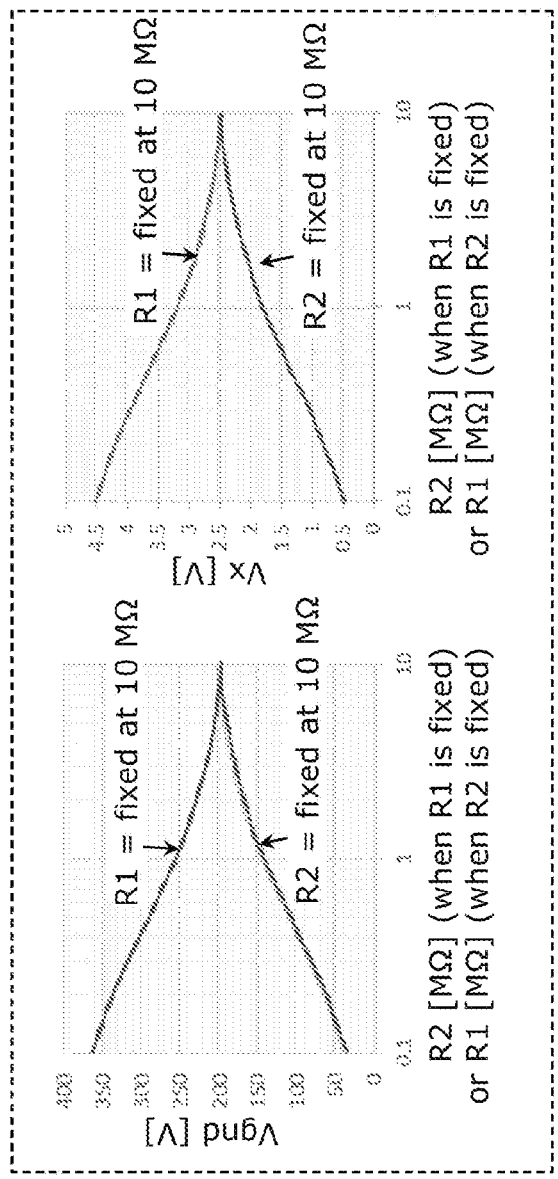
FIG. 4 is a diagram illustrating an example of a property of the current leakage detection circuit shown in FIG. 3A.

FIG. 4 is a diagram illustrating an example of a property of the current leakage detection circuit shown in FIG. 3A. In FIG. 4, conditions are set as follows: Vb=400 V, Vr=5 V, r6=0.0125 MΩ, r7=0.9875 MΩ, and r8=1 MΩ. FIG. 4 illustrates (a) electric potential Vgnd of the vehicle chassis and (b) detection voltage Vx under the following two conditions where (i) R1 is fixed at 10 MΩ while R2 is changed from 0.1 MΩ to 10 MΩ and (ii) R2 is fixed at 10 MΩ while R1 is changed from 0.1 MΩ to 10 MΩ. When insulation resistances R1 and R2 both have a high resistance as 10 MΩ, electric potential Vgnd of the vehicle-body ground is approximately determined by voltage division made by resistors 26 to 28. Accordingly, when r6+r7=r8 holds true as indicated above, the equation Vgnd=Vb/2 holds true, and detection voltage Vx can also be set at about 2.5 V. However, when an insulation failure, namely, current leakage, occurs for some reason, and, for example, insulation resistance R1 is reduced, electric potential Vgnd of the vehicle-body ground is reduced, and detection voltage Vx is also reduced along with the reduction in electric potential Vgnd of the vehicle-body ground. Alternatively, when insulation resistance R2 is reduced, electric potential Vgnd of the vehicle-body ground is increased, and detection voltage Vx is also increased along with the increase in electric potential Vgnd of the vehicle-body ground. Therefore, control circuit 53 can detect an insulation failure by determining whether detection voltage Vx is out of a predetermined range. In addition, control circuit 53 may calculate battery voltage Vb from detection voltage Vy using (Equation 4b).

As has been described above, the current leakage detection circuit can detect an insulation failure of battery 1 by setting the same detection circuit 5a using either the positive electrode or the negative electrode of battery 1 as a reference.

[1.21 Variation of Current Leakage Detection Circuit Configured Using Negative Electrode of Battery as Reference]

Next, a variation of current leakage detection circuit 10 shown in FIG. 3A will be described.

Figure 3B:
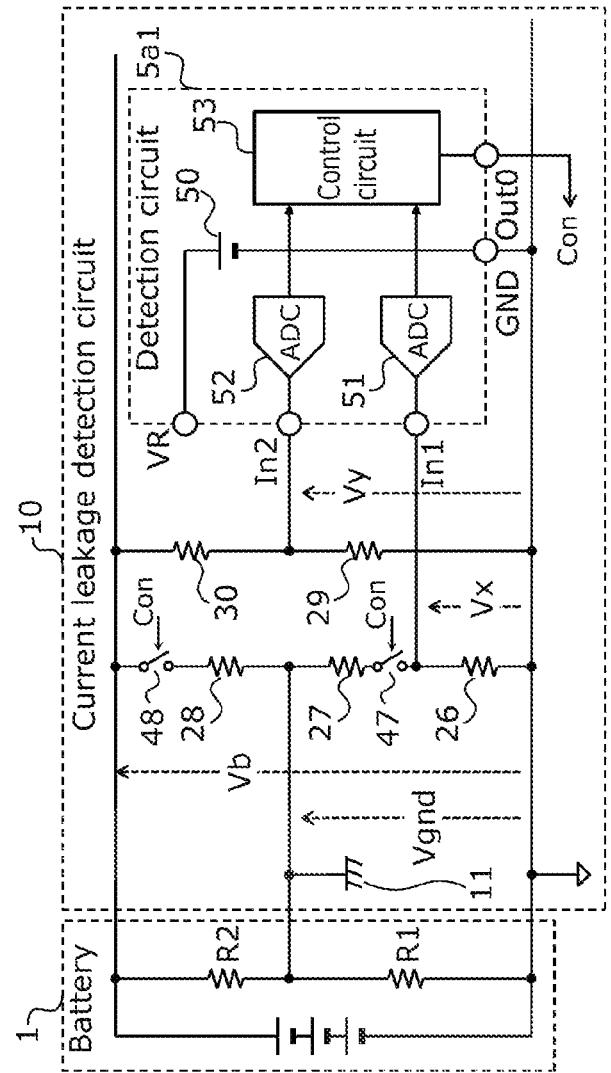
FIG. 3B is a diagram illustrating a variation of the current leakage detection circuit shown in FIG. 3A.

FIG. 3B is a diagram illustrating a variation of the current leakage detection circuit shown in FIG. 3A. Compared to FIG. 3A, current leakage detection circuit 10 shown in FIG. 3B is different in that switch 47 and switch 48 are added, and detection circuit 5a is replaced by detection circuit 5a1. Hereinafter, different points will be mainly described to avoid redundant description.

Switch 47 is connected between resistor 27 and first detection terminal In1. Specifically, the first terminal of switch 47 is connected to detection terminal In1 and the second terminal of resistor 26. The second terminal of switch 47 is connected to the first terminal of resistor 27. Switch 47 has a control terminal to which control signal Con from control circuit 53 is input.

Switch 48 is connected in series to resistor 28, and is connected between resistor 28 and the positive electrode of battery 1. Specifically, the first terminal of switch 48 is connected to the second terminal of resistor 28. The second terminal of switch 48 is connected to the positive electrode of battery 1. Switch 48 has a control terminal to which control signal Con from control circuit 53 is input.

Control circuit 53 inside detection circuit 5a1 has an additional function of generating control signal Con for controlling turning ON and OFF of switch 47 and switch 48. Control circuit 53 turns switch 47 and switch 48 ON during a period of detecting current leakage, and turns switch 47 and switch 48 OFF during a period other than the period of detecting current leakage.

This allows no current to flow through resistors for voltage division in current leakage detection circuit 10 during a period other than the period of detecting current leakage, for example.

[1.22 Another Variation of Current Leakage Detection Circuit Configured Using Negative Electrode of Battery as Reference]

Figure 3C:
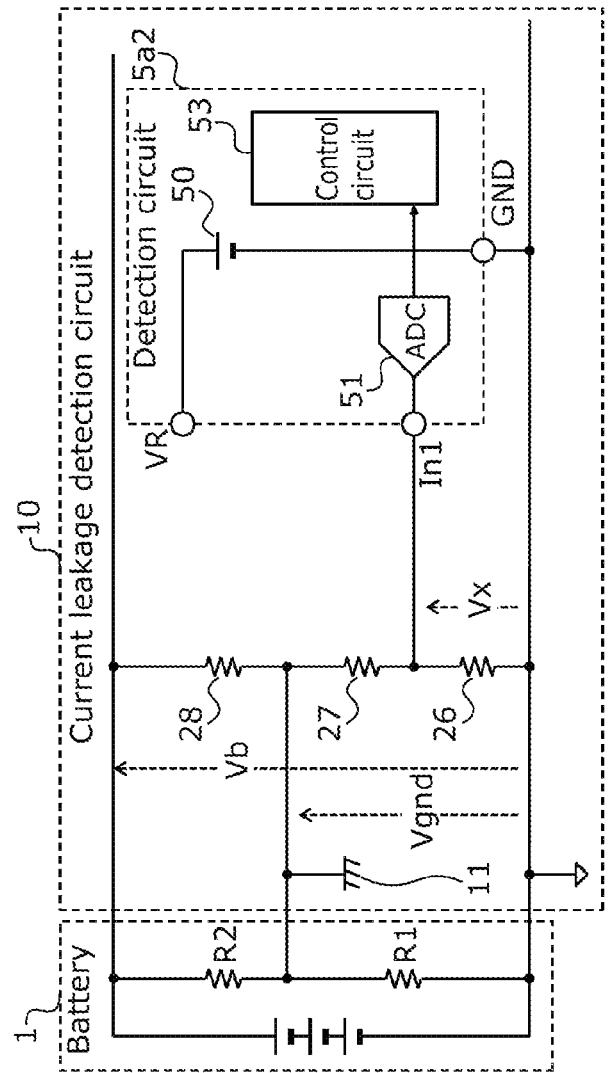
FIG. 3C is a diagram illustrating another variation of the current leakage detection circuit shown in FIG. 3A.

FIG. 3C is a diagram illustrating another variation of the current leakage detection circuit shown in FIG. 3A. Compared to FIG. 3A, current leakage detection circuit 10 shown in FIG. 3C is different in that resistor 29, resistor 30, AD converter 52, and detection terminal In2 are excluded, and detection circuit 5a is replaced by detection circuit 5a2. Hereinafter, different points will be mainly described.

The excluded resistor 29, resistor 30, AD converter 52, and detection terminal In2 are circuit parts for calculating battery voltage Vb based on voltage Vy. Consequently, detection circuit 5a2 shown in FIG. 3C illustrates an example of a configuration including the minimum number of elements required for detecting an occurrence of current leakage without calculating battery voltage Vb.

Note that the above-described switches 41, 42, 47, and 48 each may be a normally-off type switch, and may include, for example, an NMOS transistor, a PMOS transistor, a bipolar transistor, a relay, or a combination thereof.

As has been described above, current leakage detection circuit 10 according to Embodiment 1 is current leakage detection circuit 10 that detects current leakage from battery 1 having a first electrode and a second electrode to a chassis. The first electrode is one of a positive electrode and a negative electrode, and the second electrode is the other of the positive electrode and the negative electrode. Current leakage detection circuit 10 includes: detection circuit 5 including reference voltage source terminal VR for outputting reference voltage Vr, first detection terminal In1, and ground terminal GND connected to the first electrode; a first resistor (21/28) connected between the second electrode and the chassis; a second resistor (22/27) connected between the chassis and first detection terminal In1; and a third resistor (23/26) connected between first detection terminal In1 and a predetermined terminal. When the first electrode is the positive electrode, the predetermined terminal is reference voltage source terminal VR. When the first electrode is the negative electrode, the predetermined terminal is the first electrode. Detection circuit 5 detects a voltage of first detection terminal In1, and detects an occurrence of current leakage based on the voltage detected.

Here, when the first electrode is the positive electrode, current leakage detection circuit 10 corresponds to current leakage detection circuit 10 shown in FIG. 1A through FIG. 1C. Alternatively, when the first electrode is the negative electrode, current leakage detection circuit 10 corresponds to current leakage detection circuit 10 shown in FIG. 3A through FIG. 3C. Moreover, the first resistor corresponds to resistor 21 shown in FIG. 1A through FIG. 1C and resistor 28 shown in FIG. 3A through FIG. 3C. The second resistor corresponds to resistor 22 shown in FIG. 1A through FIG. 1C and resistor 27 shown in FIG. 3A through FIG. 3C. The third resistor corresponds to resistor 23 shown in FIG. 1A through FIG. 1C and resistor 26 shown in FIG. 3A through FIG. 3C. Detection circuit 5 is any one of detection circuits 5a, 5a1, and 5a2 shown in FIG. 1A through FIG. 1C and FIG. 3A through FIG. 3C, or a generic name for these detection circuits.

According to the above, current leakage detection circuit 10 can use either the positive electrode or the negative electrode of battery 1 as a reference for its zero potential.

Here, detection circuit 5 may determine that current leakage is occurring when the voltage of first detection terminal In1 is out of a predetermined range.

With this, it is possible to readily determine whether an insulation failure is occurring, or in other words, whether current leakage is occurring.

Here, detection circuit 5 may include: second detection terminal In2; a fourth resistor (24/30) connected between the second electrode and second detection terminal In2; and a fifth resistor (25/29) connected between second detection terminal In2 and the predetermined terminal. Detection circuit 5 may detect a voltage of second detection terminal In2, and calculates voltage Vb of battery 1 based on the voltage detected.

Here, the fourth resistor corresponds to resistor 24 shown in FIG. 1A through FIG. 1C and resistor 30 shown in FIG. 3A through FIG. 3C. The fifth resistor corresponds to resistor 25 shown in FIG. 1A through FIG. 1C and resistor 29 shown in FIG. 3A through FIG. 3C.

According to the above, a voltage of battery 1 can be calculated as one of indicators showing a state of battery 1, in addition to determining whether current leakage is occurring.

Here, the current leakage detection circuit may further include: a first switch (41/48) connected in series to the first resistor (21/28), and connected between the first resistor (21/28) and the second electrode; and a second switch (42/47) connected in series to the second resistor (22/27), and connected between the second resistor (22/27) and first detection terminal In1. Detection circuit 5 may control turning ON and OFF of the first switch and the second switch.

Here, the first switch corresponds to switch 41 shown in FIG. 1B and switch 48 shown in FIG. 3B. The second switch corresponds to switch 42 shown in FIG. 1B and switch 47 shown in FIG. 3B.

According to the above, the first switch and the second switch are turned ON during a period of detecting current leakage, and the first switch and the second switch are turned OFF during a period other than the period of detecting current leakage, for example. This allows no current to flow through resistors for voltage division in current leakage detection circuit 10 during a period other than the period of detecting current leakage.

Here, detection circuit 5 may include: first AD converter 51 connected to first detection terminal Int; and control circuit 53 that determines, based on first data output from the first AD converter, whether current leakage is occurring.

Since this allows a voltage value of first detection terminal Int to be obtained as first data in digital form, the control circuit is suitable for a current leakage determination performed through a digital process using a microcomputer.

Here, detection circuit 5 may include: first AD converter 51 connected to first detection terminal Int; second AD converter 52 connected to second detection terminal Int; and control circuit 53 that determines, based on first data output from the first AD converter and second data output from the second AD converter, whether current leakage is occurring, and calculates a voltage value of battery 1.

According to the above, a voltage of battery 1 can be detected based on second data, in addition to determining, based on first data, whether current leakage is occurring.

Embodiment 2

[2.1 Example of Current Leakage Detection Circuit Configured Using Positive Electrode of Battery as Reference]

Figure 5:
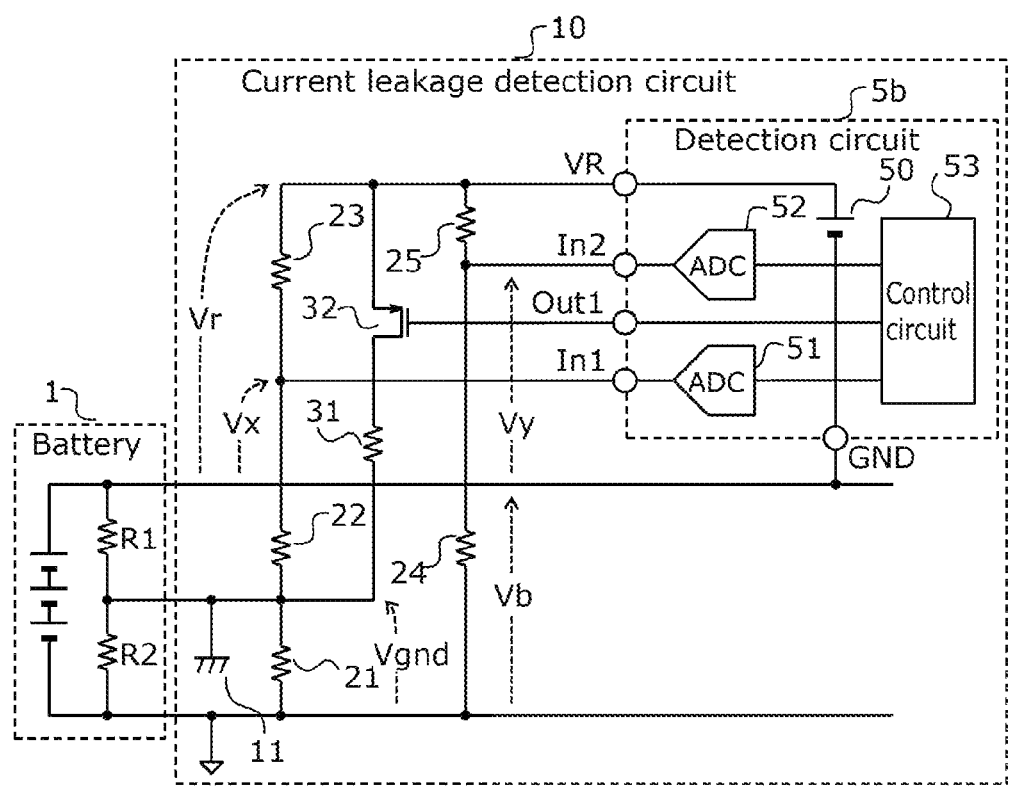
FIG. 5 is a diagram illustrating an example of a circuit configuration of a current leakage detection circuit according to Embodiment 2 which is configured on the positive electrode side of a battery.

FIG. 5 is a diagram illustrating an example of a circuit configuration of a current leakage detection circuit according to Embodiment 2. In FIG. 5, differences from FIG. 1A illustrating the current leakage detection circuit according to Embodiment 1 are that (i) a series circuit including resistor 31 and PMOS transistor 32 is provided between the vehicle-body ground and reference voltage source terminal VR and (ii) the reference sign 5b is given to a detection circuit to distinguish detection circuit 5b from the detection circuit shown in FIG. 1A. Hereinafter, different points will be mainly described.

Resistor 31 is connected between chassis 11 and PMOS transistor 32. Specifically, the first terminal of resistor 31 is connected to chassis 11. The second terminal of resistor 31 is connected to the first terminal of PMOS transistor 32. Resistor 31 has a resistance value of r11.

PMOS transistor 32 is connected between resistor 31 and reference voltage source terminal VR. Specifically, the first terminal (i.e., drain) of PMOS transistor 32 is connected to the second terminal of resistor 31. The second terminal (i.e., source) of PMOS transistor 32 is connected to reference voltage source terminal VR. The gate of PMOS transistor 32 is connected to drive terminal Out1.

Detection circuit 5b is different from detection circuit 5a shown in FIG. 1A in that detection circuit 5b includes drive terminal Out1 that outputs a driving signal to PMOS transistor 32 according to a command sent from internal control circuit 53. This driving signal controls the ON state and the OFF state of PMOS transistor 32.

First, when PMOS transistor 32 is brought into the OFF state by drive terminal Out1 outputting a high-level driving signal equivalent to reference voltage Vr, the circuit configuration roughly equals to the circuit configuration shown in FIG. 1A. Accordingly, voltages of elements are expressed by (Equation 7a) through (Equation 9), in the same manner as (Equation 1a) through (Equation 3). In order to distinguish PMOS transistor 32 in the OFF state from PMOS transistor 32 in the ON state that will be described later, it should be noted that electric potential Vgnd of the vehicle-body ground is designated as electric potential Vg1 and detection voltage Vx is designated as detection voltage Vx1 when PMOS transistor 32 is in the OFF state.

[Math. 7]

$$Vy = \frac{r4 \cdot Vr - r5 \cdot Vb}{r4 + r5} \quad \text{(Equation 7a)}$$

$$Vb = \frac{r4}{r5} \cdot (Vr - Vy) - Vy \quad \text{(Equation 7b)}$$

[Math. 8]

$$Vx1 = Vr - \frac{r3}{r2 + r3} \cdot (Vb + Vr - Vg1) \quad \text{(Equation 8a)}$$

$$Vg1 = Vb - \frac{r2}{r3} \cdot (Vr - Vx1) + Vx1 \quad \text{(Equation 8b)}$$

[Math. 9]

$$Vg1 = \left(\frac{Vb}{R2} + \frac{Vb + Vr}{r2 + r3}\right) \bigg/ \left(\frac{1}{R1} + \frac{1}{R2} + \frac{1}{r1} + \frac{1}{r2 + r3}\right) \quad \text{(Equation 9)}$$

Next, when PMOS transistor 32 is brought into the ON state by drive terminal Out1 outputting a low-level driving signal equivalent to zero potential, resistor 31 is connected in parallel between the vehicle-body ground and reference voltage terminal VR. For this reason, the electric potential of the vehicle-body ground is higher than the electric potential of the vehicle-body ground when PMOS transistor 32 is in the OFF state. Suppose that electric potential Vgnd of the vehicle-body ground is designated as electric potential Vg2 and detection voltage Vx is designated as detection voltage Vx2 in this case, Vg2 and Vx2 can be expressed by (Equation 10a) through (Equation 11).

[Math. 10]

$$Vx2 = Vr - \frac{r3}{r2 + r3} \cdot (Vb + Vr - Vg2) \quad \text{(Equation 10a)}$$

$$Vg2 = Vb - \frac{r2}{r3} \cdot (Vr - Vx2) + Vx1 \quad \text{(Equation 10b)}$$

[Math. 11]

$$Vg2 = \left(\frac{Vb}{R2} + \frac{Vb + Vr}{r2 + r3} + \frac{Vb + Vr}{r11}\right) \bigg/ \left(\frac{1}{R1} + \frac{1}{R2} + \frac{1}{r1} + \frac{1}{r2 + r3} + \frac{1}{r11}\right) \quad \text{(Equation 11)}$$

Figure 6:
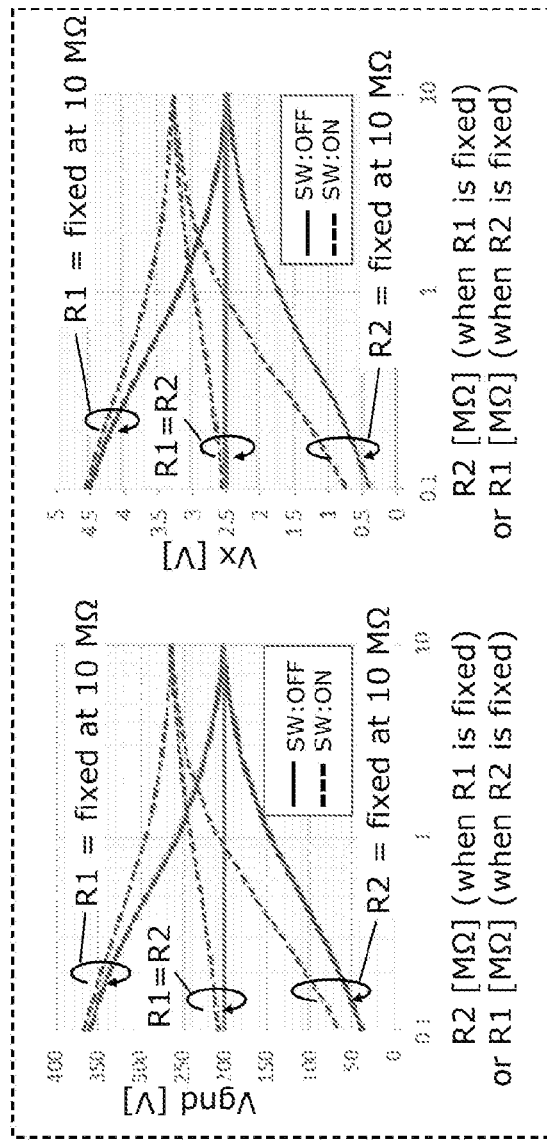
FIG. 6 is a diagram illustrating an example of a property of the current leakage detection circuit according to Embodiment 2.

FIG. 6 is a diagram illustrating an example of a property of the current leakage detection circuit shown in FIG. 5. In FIG. 6, conditions are set as follows: Vb=400 V, Vr=5 V, r2=r10=1 MΩ, r3=0.9875 MΩ, and r4=0.0125 MΩ. FIG. 6 illustrates (a) electric potential Vgnd of the vehicle-body chassis and (b) detection voltage Vx under the following two conditions where (i) R1 is fixed at 10 MΩ while R2 is changed from 0.1 MΩ to 10 MΩ and (ii) R2 is fixed at 10 MΩ while R1 is changed from 0.1 MΩ to 10 MΩ. Moreover, a solid line denotes PMOS transistor 32 in the OFF state, and a dashed line denotes PMOS transistor 32 in the ON state.

When PMOS transistor 32 is in the OFF state, changes in electric potential Vgnd of the ground and detection voltage Vx will be the same as those shown in FIG. 2. However, when equivalent insulation resistances of the positive electrode side and the negative electrode side as expressed by R1=R2 are equally reduced, changes in electric potential Vgnd of the ground and detection voltage Vx are also reduced, and thus making current leakage detection difficult. Meanwhile, when PMOS transistor 32 is in the ON state and insulation resistances R1 and R2 are under normal condition in which insulation resistances R1 and R2 are high, electric potential Vgnd of the ground is displaced to the positive electrode side of the battery by resistor 31, and changes with the reduction in the insulation resistances. Ways that electric potential Vgnd and detection voltage Vx change do not differ between the ON state and the OFF state of PMOS transistor 32. When, for example, insulation resistance R1 is reduced, electric potential Vgnd of the vehicle-body ground is reduced, and detection voltage Vx is also reduced along with the reduction in electric potential Vgnd of the vehicle-body ground. Alternatively, when insulation resistance R2 is reduced, electric potential Vgnd of the vehicle-body ground is increased, and detection voltage Vx is also increased along with the increase in electric potential Vgnd of the vehicle-body ground. When R1=R2, electric potential Vgnd of the vehicle-body ground asymptotically approaches Vb/2. As has been described above, under the normal condition, a detection voltage of PMOS transistor 32 in the OFF state is determined by resistors 21, 22, and 23, and a detection voltage of PMOS transistor 32 in the ON state is increased due to an effect of resistor 31. However, when an insulation failure occurs for some reason and insulation resistances R1 and R2 are reduced, a difference between the detection voltage in the ON state and the detection voltage in the OFF state is reduced. This difference between the detection voltages being less than or equal to a predetermined value allows detection of an insulation failure. An insulation failure can be, of course, determined by detection voltage Vx being out of a predetermined range as described in Embodiment 1, along with the foregoing insulation failure detection.

Although current leakage is detected by comparing detection voltage Vx with a predetermined threshold in the above description, insulation resistances R1 and R2 can be calculated if the detection circuit has a calculation function. First, electric potentials Vg1 and Vg2 of the vehicle-body ground are calculated from detection voltages Vx1 and Vx2, using (Equation 8b) and (Equation 10b). By solving the above and simultaneous equations relating to R1 and R2 which are set up from (Equation 9) and (Equation 11), insulation resistances R1 and R2 can be calculated as shown in (Equation 12) and (Equation 13).

[Math. 12]

$$R1 = \left( \frac{Vb - Vg1}{Vg2 - Vg1} \cdot \frac{Vb + Vr - Vg2}{Vb} \cdot \frac{1}{r11} + \frac{Vr}{Vb} \cdot \frac{1}{r2 + r3} - \frac{1}{r1} \right)^{-1}$$

(Equation 12)

[Math. 13]

$$R2 = \left( \frac{Vg1}{Vg2 - Vg1} \cdot \frac{Vb + Vr - Vg2}{Vb} \cdot \frac{1}{r11} + \frac{Vb + Vr}{Vb} \cdot \frac{1}{r2 + r3} \right)^{-1}$$

(Equation 13)

Note that in the calculation of insulation resistances R1 and R2 from (Equation 12) and (Equation 13), voltage Vb of battery 1 may be calculated from (Equation 4b) or (Equation 7b) or may be externally obtained. For example, when a measurement circuit that measures voltage Vb of battery 1 is externally present, voltage Vb may be obtained from the measurement circuit.

[2.2 Example of Current Leakage Detection Circuit Configured Using Negative Electrode of Battery as Reference]

Figure 7:
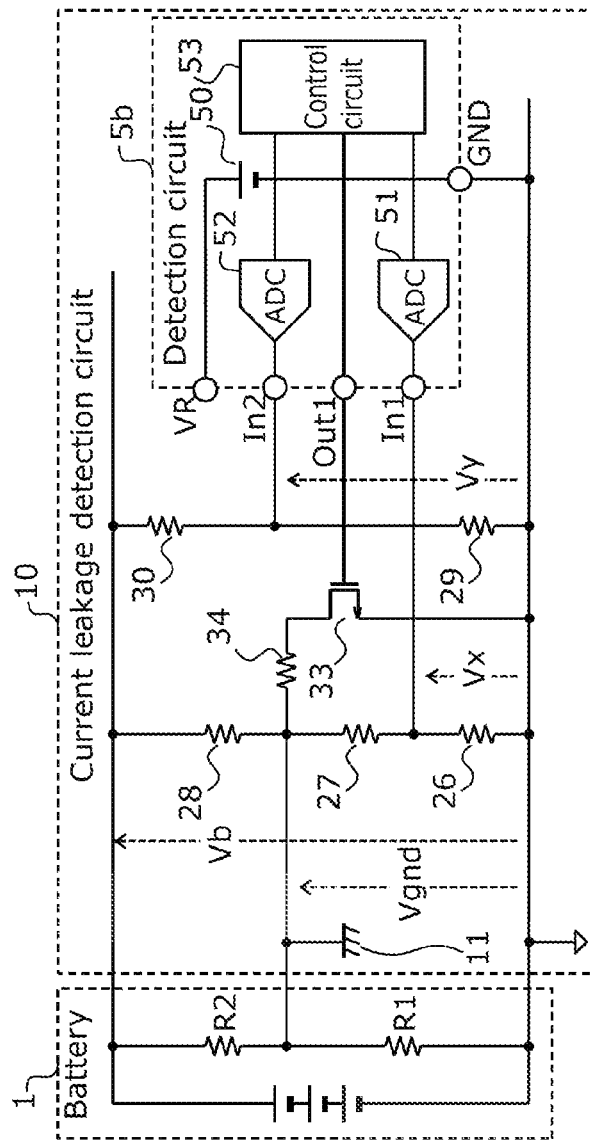
FIG. 7 is a diagram illustrating an example of a circuit configuration of the current leakage detection circuit according to Embodiment 2 which is configured on the negative electrode side of the battery.

Also in this embodiment, a current leakage detection circuit can include a detection circuit that is configured to regard the negative electrode of battery 1 as zero potential. FIG. 7 is a diagram illustrating an example of a circuit configuration of a current leakage detection circuit including detection circuit 5b shown in FIG. 5 that is configured to regard the negative electrode of battery 1 as zero potential. In FIG. 7, differences from FIG. 3A are that (i) a series circuit including NMOS transistor 33 and resistor 34 is provided between the vehicle-body ground and the negative electrode of battery 1 and (ii) the reference sign 5b is given to a detection circuit to distinguish detection circuit 5b from the detection circuit shown in FIG. 1A. Hereinafter, different points will be mainly described.

Resistor 34 is connected between chassis 11 and NMOS transistor 33. Specifically, the first terminal of resistor 34 is connected to the second terminal of NMOS transistor 33. The second terminal of resistor 34 is connected to chassis 11. Resistor 34 has a resistance value of r14.

NMOS transistor 33 is connected between the negative electrode of battery 1 and resistor 34. Specifically, the first terminal (i.e., source) of NMOS transistor 33 is connected to the negative electrode of battery 1. The second terminal (i.e., drain) of NMOS transistor 33 is connected to the first terminal of resistor 34. The gate of NMOS transistor 33 is connected to drive terminal Out1.

Ground terminal GND of detection circuit 5b is connected to the negative electrode of battery 1. Drive terminal Out1 outputs a driving signal for driving NMOS transistor 33. This driving signal controls the ON state and the OFF state of NMOS transistor 33.

First, when NMOS transistor 33 is brought into the OFF state by drive terminal Out1 outputting a low-level driving signal of zero potential, the circuit configuration roughly equals to the circuit configuration shown in FIG. 3A. Accordingly, voltages of elements are expressed by (Equation 14a) and (Equation 17), in the same manner as (Equation 4a) through (Equation 6). In order to distinguish NMOS transistor 33 in the OFF state from NMOS transistor 33 in the ON state that will be described later, it should be noted that electric potential Vgnd of the vehicle-body ground is designated as electric potential Vg3 and detection voltage Vx is designated as detection voltage Vx3 when NMOS transistor 33 is in the OFF state. Detection voltage Vx3 and electric potential Vg3 are expressed by (Equation 14a), (Equation 14b), and (Equation 15).

[Math. 14]

$$Vx3 = \frac{r6}{r6+r7} \cdot Vg3 \qquad \text{(Equation 14a)}$$

$$Vg3 = \left(1 + \frac{r7}{r6}\right) \cdot Vx3 \qquad \text{(Equation 14b)}$$

[Math. 15]

$$Vg3 = Vb \cdot \left(\frac{1}{R2} + \frac{1}{r8}\right) \bigg/ \left(\frac{1}{R1} + \frac{1}{R2} + \frac{1}{r6+r7} + \frac{1}{r8}\right) \qquad \text{(Equation 15)}$$

Next, when NMOS transistor 33 is brought into the ON state by drive terminal Out1 outputting a high-level driving signal equivalent to reference voltage Vr, resistor 34 is connected in parallel between the vehicle-body ground and ground terminal GND. For this reason, the electric potential of the vehicle-body ground is lower than the electric potential of the vehicle-body ground when NMOS transistor 33 is in the OFF state. Suppose that electric potential Vgnd of the vehicle-body ground is designated as electric potential Vg4 and detection voltage Vx is designated as detection voltage Vx4 in this case, Vx4 and Vg4 are expressed by (Equation 16a) and (Equation 16b).

[Math. 16]

$$Vx4 = \frac{r6}{r6+r7} \cdot Vg4 \qquad \text{(Equation 16a)}$$

$$Vg4 = \left(1 + \frac{r7}{r6}\right) \cdot Vx4 \qquad \text{(Equation 16b)}$$

[Math. 17]

$$Vg4 = Vb \cdot \left(\frac{1}{R2} + \frac{1}{r8}\right) \bigg/ \left(\frac{1}{R1} + \frac{1}{R2} + \frac{1}{r6+r7} + \frac{1}{r8} + \frac{1}{r14}\right) \qquad \text{(Equation 17)}$$

Figure 8:
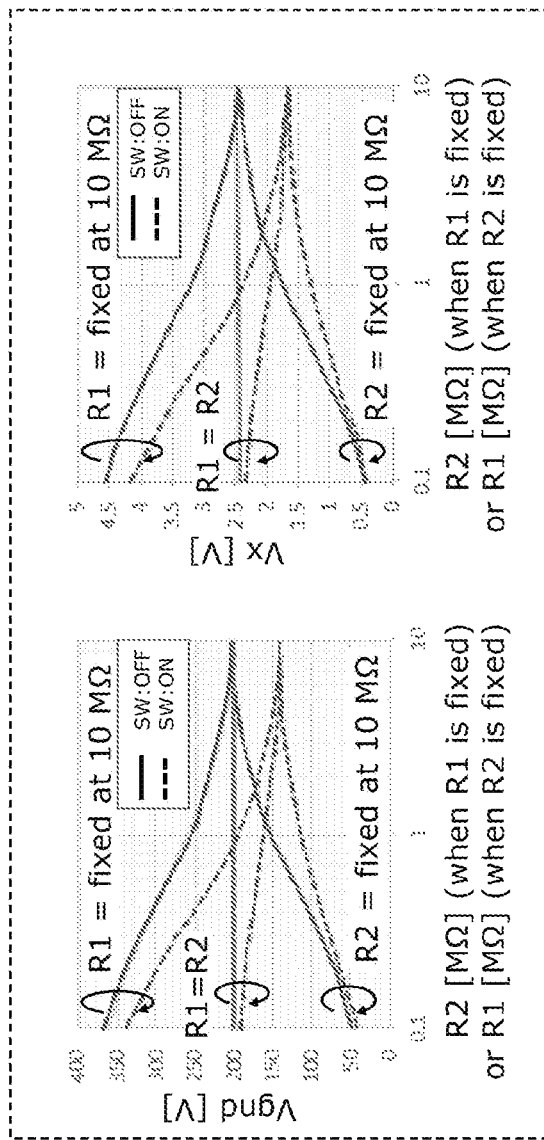
FIG. 8 is a diagram illustrating an example of a property of the current leakage detection circuit shown in FIG. 7.

FIG. 8 is a diagram illustrating an example of a property of the current leakage detection circuit shown in FIG. 7. In FIG. 8, conditions are set as follows: Vb=400 V, Vr=5 V, r6=0.0125 MΩ, r7=0.9875 MΩ, and r8=r14=1 MΩ. FIG. 8 illustrates (a) electric potential Vgnd of the vehicle-body chassis and (b) detection voltage Vx under the following two conditions where (i) R1 is fixed at 10 MΩ while R2 is changed from 0.1 MΩ to 10 MΩ and (ii) R2 is fixed at 10 MΩ while R1 is changed from 0.1 MΩ to 10 MΩ. Moreover, a solid line denotes NMOS transistor 33 in the OFF state, and a dashed line denotes NMOS transistor 33 in the ON state.

When NMOS transistor 33 is in the ON state and insulation resistances R1 and R2 are under normal condition in which insulation resistances R1 and R2 are high, electric potential Vgnd of the ground is displaced to the negative electrode side of the battery by resistor 11. Besides the above-described point, ways that electric potential Vgnd of the vehicle-body ground and detection voltage Vx change due to insulation resistances R1 and R2 are the same as the ways shown in FIG. 6. To be more specific, under the normal condition, a detection voltage of NMOS transistor 33 in the OFF state is determined by resistors 26, 27, and 28, and a detection voltage of NMOS transistor 33 in the ON state is reduced due to an effect of resistor 34. However, when an insulation failure occurs for some reason and insulation resistances R1 and R2 are reduced, a difference between the detection voltage in the ON state and the detection voltage in the OFF state is reduced. This difference between the detection voltages being less than or equal to a predetermined value allows detection of an insulation failure. An insulation failure can be, of course, determined by a detection voltage being out of a predetermined range as described in Embodiment 1, along with the foregoing insulation failure detection.

Although current leakage is detected by comparing detection voltage Vx with a predetermined threshold in the above description, insulation resistances R1 and R2 can be calculated if the detection circuit has a calculation function in this embodiment also, like the descriptions provided for FIG. 3A and FIG. 4. Using (Equation 14b) and (Equation 16b), electric potentials Vg3 and Vg4 of the vehicle-body ground are calculated from detection voltages Vx3 and Vx4. By solving the above and simultaneous equations relating to R1 and R2 which are set up from (Equation 15) and (Equation 17), insulation resistances R1 and R2 can be calculated as shown in (Equation 18) and (Equation 19).

[Math. 18]

$$R1 = \left(\frac{Vb - Vg3}{Vg3 - Vg4} \cdot \frac{Vg4}{Vb} \cdot \frac{1}{r14} - \frac{1}{r6+r7}\right)^{-1} \qquad \text{(Equation 18)}$$

[Math. 19]

$$R2 = \left(\frac{Vg3}{Vg3 - Vg4} \cdot \frac{Vg4}{Vb} \cdot \frac{1}{r14} - \frac{1}{r14} - \frac{1}{r8}\right)^{-1} \qquad \text{(Equation 19)}$$

As has been described above, current leakage detection circuit 10 according to the embodiment can set the same detection circuit 5b to either the positive electrode side or the negative electrode side of battery 1. Current leakage detection circuit 10 can calculate resistance values of insulation resistances R1 and R2 by connecting different resistance loads between a battery and the vehicle-body ground by further using a switching element.

Note that although several conditions have been created using a switching element to obtain simultaneous equations for calculating the insulation resistances in this embodiment, calculation of the insulation resistances is not limited to such a method.

As has been described above, current leakage detection circuit 10 according to Embodiment 2 includes a series circuit including a resistance element (31/34) and a switching element (32/33) which is connected between the chassis and the predetermined terminal. Detection circuit 5 includes drive terminal Out1 that drives switching between an open state and a closed state of the switching element (32/33).

Here, the resistance element corresponds to resistor 31 shown in FIG. 5 and resistor 34 shown in FIG. 7. The switching element corresponds to PMOS transistor 32 shown in FIG. 5 and NMOS transistor 33 shown in FIG. 7.

With this, it is possible to readily determine whether current leakage is occurring.

Here, detection circuit 5 may: detect the voltage of the first detection terminal during a time at which the switching element (32/33) is in the open state as a first voltage; detect the voltage of the first detection terminal during a time at which the switching element (32/33) is in the closed state as a second voltage; and determine that current leakage is occurring when a difference between the first voltage and the second voltage is less than or equal to a predetermined value.

Here, the first voltage corresponds to voltage Vx expressed by Equation 8a and Equation 8b which relate to FIG. 5, and voltage Vx2 expressed by Equation 10a and Equation 10b which relate to FIG. 7. The second voltage corresponds to voltage Vx3 expressed by Equation 14a and Equation 14b which relate to FIG. 5, and voltage Vx4 expressed by Equation 16a and Equation 16b which relate to FIG. 7.

With this, it is possible to readily determine whether current leakage is occurring.

Here, the detection circuit may: detect the voltage of the first detection terminal during a time at which the switching element is in the open state as a first voltage; detect the voltage of the first detection terminal during a time at which the switching element is in the closed state as a second voltage; and calculate, based on the first voltage and the second voltage, a resistance value between the positive electrode of battery 1 and the chassis and a resistance value between the negative electrode of battery 1 and the chassis.

With this, two insulation resistance values of two insulation resistances R1 and R2, namely, a resistance value between the positive electrode of battery 1 and the chassis and a resistance value between the negative electrode of battery 1 and the chassis, are calculated. Accordingly, current leakage can be quantitatively determined even if equivalent insulation resistances R1 and R2 are coincidentally and equally reduced. In addition, it is possible to determine whether the current leakage is occurring on the positive electrode side or the negative electrode side.

Here, the detection circuit may include: second detection terminal In2; a fourth resistor (24/30) connected between the second electrode and second detection terminal In2; and a fifth resistor (25/29) connected between second detection terminal In2 and the predetermined terminal. The detection circuit may: detect a voltage of second detection terminal Int, and calculates a voltage (Vb) of the battery based on the voltage detected; detect the voltage of the first detection terminal during a time at which the switching element is in the open state as a first voltage; detect the voltage of the first detection terminal during a time at which the switching element is in the closed state as a second voltage; and calculate, based on the voltage of the battery, the first voltage, and the second voltage, resistance value R2 between the positive electrode of battery 1 and the chassis and resistance value R1 between the negative electrode of battery 1 and the chassis.

With this, current leakage can also be quantitatively determined even if equivalent insulation resistances R1 and R2 are coincidentally and equally reduced. In addition, it is possible to determine whether the current leakage is occurring on the positive electrode side or the negative electrode side.

Embodiment 3

[3.1 Example of Current Leakage Detection Circuit Configured Using Positive Electrode of Battery as Reference]

Figure 9:
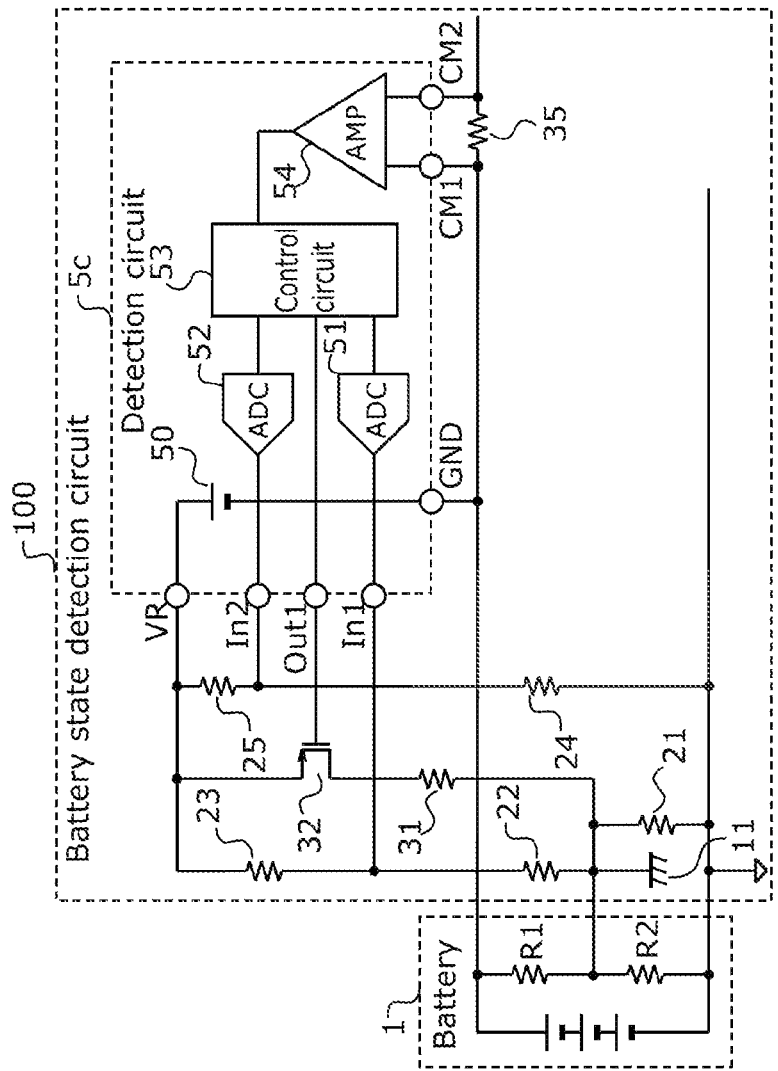
FIG. 9 is a diagram illustrating an example of a circuit configuration of a battery state detection circuit in which a current leakage detection circuit according to Embodiment 3 is provided on the positive electrode side of a battery.

FIG. 9 is a diagram illustrating a configuration example of battery state detection circuit 100 obtained by, as Embodiment 3, adding a battery current detection circuit to the current leakage detection circuit according to Embodiment 2. In FIG. 9, differences from FIG. 5 illustrating the current leakage detection circuit according to Embodiment 2 are that (i) resistor 35 is provided between the positive electrode of a battery and a load (not illustrated) and (ii) the detection circuit includes AMP 54 that detects and amplifies a voltage across resistor 35 to output the amplified voltage to control circuit 53. The detection circuit is given the reference sign 5c to distinguish detection circuit 5c from the detection circuits shown in FIG. 1 and FIG. 5.

Resistor 35 is a resistor for current detection that is connected between the positive electrode of battery 1 and the load.

AMP 54 detects a voltage across resistor 35 as a signal indicating a current value of battery 1.

[3.2 Example of Current Leakage Detection Circuit Configured Using Negative Electrode of Battery as Reference]

Figure 10:
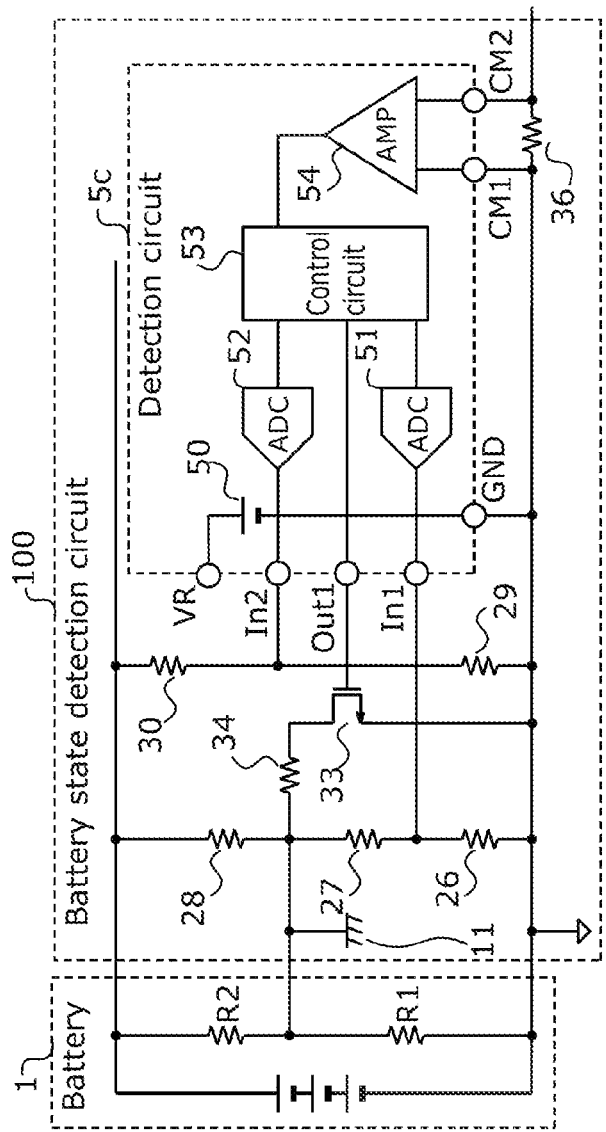
FIG. 10 is a diagram illustrating an example of a circuit configuration of the battery state detection circuit in which the current leakage detection circuit according to Embodiment 3 is provided on the negative electrode side of the battery.

In addition, FIG. 10 illustrates a configuration of battery state detection circuit 100 in which detection circuit 5c is provided on the negative electrode side of the battery. In FIG. 10, differences from FIG. 7 of Embodiment 2 are that (i) resistor 36 is provided between the negative electrode of the battery and a load (not illustrated) and (ii) AMP 54 of detection circuit 5c detects and amplifies a voltage across resistor 36 to output the amplified voltage to control circuit 53.

Resistor 36 is a resistor for current detection that is connected between the negative electrode of battery 1 and the load.

AMP 54 detects a voltage across resistor 36 as a signal indicating a current value of battery 1. This current value indicates the magnitude of a discharge current or a charge current of battery 1.

As has been described above, a current leakage detection circuit can set its detection circuit on either the positive electrode side or the negative electrode side according to the installation position of the current detection circuit. With this, an overall configuration can be simplified by, for example, creating an integrated circuit as a battery state detection circuit that detects a voltage and a current of a battery, and an occurrence of current leakage in the battery.

As has been described above, battery state detection circuit 100 according to Embodiment 3 includes the above-described current leakage detection circuit 10, current detection resistor 35/36 connected between the first electrode and a load, and amplifier circuit 54 that detects a voltage across current detection resistor 35/36 as a signal indicating a current value of battery 1.

With this, the battery state detection circuit can use either the positive electrode or the negative electrode of battery 1 as a reference for its zero potential. In addition, the battery state detection circuit can detect a current value at which battery 1 is charged or discharged and an occurrence of current leakage as indicators showing battery states.

In addition, battery state detection circuit 100 according to Embodiment 3 includes: the above-described current leakage detection circuit 10; current detection resistor 35/36 connected between the first electrode and a load; and amplifier circuit 54 that detects a voltage across current detection resistor 35/36 as a signal indicating a current value of battery 1. The detection circuit includes: first AD converter 51 connected to first detection terminal Int; second AD converter 52 connected to second detection terminal Int; and control circuit 53 that determines, based on first data output from first AD converter 51 and second data output from second AD converter 52, whether current leakage is occurring, and calculates a voltage value and a current value of the battery.

Here, the current detection resistor corresponds to resistor 35 shown in FIG. 9 and resistor 36 shown in FIG. 10.

With this, the battery state detection circuit can use either the positive electrode or the negative electrode of a battery as a reference for its zero potential. In addition, the battery state detection circuit can detect a voltage value of a battery, a current value at which the battery is charged or discharged, and an occurrence of current leakage as indicators showing battery states.

Here, amplifier circuit 54 may be included in the detection circuit.

With this, a current value at which a battery is charged or discharged can be detected as a function of a detection circuit, in addition to determining whether current leakage is occurring.

Here, the detection circuit may be an integrated circuit.

With this, the detection circuit can be downsized as an IC chip, can reduce costs, and can improve usability.

Note that current leakage detection circuit 10 shown in FIG. 5 may include an NMOS transistor instead of PMOS transistor 32. In this case, control circuit 53 is to invert a logical level of a driving signal. Moreover, current leakage detection circuit 10 shown in FIG. 5 may include a switching circuit in which a PMOS transistor and an NMOS transistor are combined in parallel, instead of PMOS transistor 32.

In addition, current leakage detection circuit 10 shown in FIG. 5 may additionally include switch 41 and switch 42 in the same manner as the current leakage detection circuit shown in FIG. 1B, and may be configured such that control circuit 53 controls switch 41 and switch 42. Moreover, current leakage detection circuit 10 shown in FIG. 5 may exclude resistor 24, resistor 25, and detection terminal In2 in the same manner as the current leakage detection circuit shown in FIG. 1C.

Note that current leakage detection circuit 10 shown in FIG. 7 may include a PMOS transistor, instead of NMOS transistor 33. In this case, control circuit 53 is to invert a logical level of a driving signal. In addition, current leakage detection circuit 10 shown in FIG. 7 may include a switching circuit in which a PMOS transistor and an NMOS transistor are combined in parallel, instead of NMOS transistor 33.

Moreover, current leakage detection circuit 10 shown in FIG. 7 may additionally include switch 47 and switch 48 in the same manner as the current leakage detection circuit shown in FIG. 3B, and may be configured such that control circuit 53 controls switch 47 and switch 48. Furthermore, current leakage detection circuit 10 shown in FIG. 7 may exclude resistor 29, resistor 30, and detection terminal In2 in the same manner as the current leakage detection circuit shown in FIG. 3C.

Note that battery state detection circuit 100 shown in FIG. 9 may additionally include switch 41 and switch 42 in the same manner as the current leakage detection circuit shown in FIG. 1B, and may be configured such that control circuit 53 controls switch 41 and switch 42.

In addition, battery state detection circuit 100 shown in FIG. may additionally include switch 47 and switch 48 in the same manner as the current leakage detection circuit shown in FIG. 3B, and may be configured such that control circuit 53 controls switch 47 and switch 48.

Several embodiments according to the present disclosure have been described; however, these embodiments have been presented as examples. Therefore, these embodiments are not intended to limit the scope of the present disclosure. These embodiments can be implemented in other various forms, and various omissions, replacements, and changes can be made within a scope not departing from the essence of the invention. Like the scope and essence of the present disclosure encompass these embodiments and their variations, the invention recited in the claims and the equivalent thereof also encompass these embodiments and their variations.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The invention claimed is:

1. A current leakage detection circuit that detects current leakage from a battery having a first electrode and a second electrode to a chassis, the first electrode being one of a positive electrode and a negative electrode, the second electrode being an other of the positive electrode and the negative electrode, the current leakage detection circuit comprising:
   a detection circuit including a reference voltage source terminal for outputting a reference voltage, a first detection terminal, and a ground terminal connected to the first electrode;
   a first resistor connected between the second electrode and the chassis;
   a second resistor connected between the chassis and the first detection terminal; and
   a third resistor connected between the first detection terminal and a predetermined terminal, wherein
   the first electrode is the positive electrode, and the predetermined terminal is the reference voltage source terminal, and
   the detection circuit detects a voltage of the first detection terminal, and detects an occurrence of current leakage based on the voltage detected.

2. The current leakage detection circuit according to claim 1, wherein
   the detection circuit determines that current leakage is occurring when the voltage of the first detection terminal is out of a predetermined range.

3. The current leakage detection circuit according to claim 1, further comprising:
   a series circuit including a resistance element and a switching element which is connected between the chassis and the predetermined terminal, wherein
   the detection circuit includes a drive terminal that drives switching between an open state and a closed state of the switching element.

4. The current leakage detection circuit according to claim 3, wherein
   the detection circuit:
     detects the voltage of the first detection terminal during a time at which the switching element is in the open state as a first voltage;
     detects the voltage of the first detection terminal during a time at which the switching element is in the closed state as a second voltage; and
     determines that current leakage is occurring when a difference between the first voltage and the second voltage is less than or equal to a predetermined value.

5. The current leakage detection circuit according to claim 3, wherein
   the detection circuit:
     detects the voltage of the first detection terminal during a time at which the switching element is in the open state as a first voltage;
     detects the voltage of the first detection terminal during a time at which the switching element is in the closed state as a second voltage; and calculates, based on the first voltage and the second voltage, a resistance value between the positive electrode of the battery and the chassis and a resistance value between the negative electrode of the battery and the chassis.

6. The current leakage detection circuit according to claim 3, wherein
the detection circuit includes:
a second detection terminal;
a fourth resistor connected between the second electrode and the second detection terminal; and
a fifth resistor connected between the second detection terminal and the predetermined terminal, and
the detection circuit:
detects a voltage of the second detection terminal, and calculates a voltage of the battery based on the voltage detected;
detects the voltage of the first detection terminal during a time at which the switching element is in the open state as a first voltage;
detects the voltage of the first detection terminal during a time at which the switching element is in the closed state as a second voltage; and
calculates, based on the voltage of the battery, the first voltage, and the second voltage, a resistance value between the positive electrode of the battery and the chassis and a resistance value between the negative electrode of the battery and the chassis.

7. The current leakage detection circuit according to claim 1, wherein
the detection circuit includes:
a second detection terminal;
a fourth resistor connected between the second electrode and the second detection terminal; and
a fifth resistor connected between the second detection terminal and the predetermined terminal, and
the detection circuit detects a voltage of the second detection terminal, and calculates a voltage of the battery based on the voltage detected.

8. The current leakage detection circuit according to claim 7, wherein
the detection circuit includes:
a first AD converter connected to the first detection terminal;
a second AD converter connected to the second detection terminal; and
a control circuit that determines, based on first data output from the first AD converter and second data output from the second AD converter, whether current leakage is occurring, and calculates a voltage value of the battery.

9. The current leakage detection circuit according to claim 1, further comprising:
a first switch connected in series to the first resistor, and connected between the first resistor and the second electrode; and
a second switch connected in series to the second resistor, and connected between the second resistor and the first detection terminal, wherein
the detection circuit controls turning ON and OFF of the first switch and the second switch.

10. The current leakage detection circuit according to claim 1, wherein
the detection circuit includes:
a first AD converter connected to the first detection terminal; and
a control circuit that determines, based on first data output from the first AD converter, whether current leakage is occurring.

11. A battery state detection circuit comprising:
the current leakage detection circuit according to claim 1;
a current detection resistor connected between the first electrode and a load; and
an amplifier circuit that detects a voltage across the current detection resistor as a signal indicating a current value of the battery and outputs the signal to the detection circuit.

12. The battery state detection circuit according to claim 11, wherein
the amplifier circuit is included in the detection circuit.

13. The battery state detection circuit according to claim 12, wherein
the detection circuit is an integrated circuit.

14. A battery state detection circuit comprising:
the current leakage detection circuit according to claim 7;
a current detection resistor connected between the first electrode and a load; and
an amplifier circuit that detects a voltage across the current detection resistor as a signal indicating a current value of the battery and outputs the signal to the detection circuit, wherein
the detection circuit includes:
a first AD converter connected to the first detection terminal;
a second AD converter connected to the second detection terminal; and
a control circuit that determines, based on first data output from the first AD converter and second data output from the second AD converter, whether current leakage is occurring, and calculates a voltage value and a current value of the battery.

* * * * *